United States Patent
Chen et al.

(10) Patent No.: US 9,641,945 B2
(45) Date of Patent: May 2, 2017

(54) BLUETOOTH HEARING AID SYSTEM

(71) Applicant: UBDEVICE CORP., Taoyuan County (TW)

(72) Inventors: Wei-Chieh Chen, Tao-Yuan Hsien (TW); Chia-Te Lai, Miaoli County (TW)

(73) Assignee: UBDEVICE CORP., Taoyuan (TW)

( * ) Notice: Subject to any disclaimer, the term of this patent is extended or adjusted under 35 U.S.C. 154(b) by 160 days.

(21) Appl. No.: 14/499,231

(22) Filed: Sep. 28, 2014

(65) Prior Publication Data
US 2016/0094921 A1    Mar. 31, 2016

(51) Int. Cl.
  *H04R 25/00* (2006.01)
  *H04W 4/00* (2009.01)

(52) U.S. Cl.
  CPC ......... *H04R 25/554* (2013.01); *H04R 25/558* (2013.01); *H04W 4/008* (2013.01); *H04R 2225/41* (2013.01); *H04R 2225/55* (2013.01)

(58) Field of Classification Search
  CPC .... H04R 25/55; H04R 25/505; H04R 25/552; H04R 25/554; H04R 25/558; H04R 25/70; H04R 2205/041; H04R 2225/41; H04R 2225/55; H04W 4/008; H04M 1/6064
  USPC ... 381/23.1, 58, 60, 312, 314, 315, 320, 321
  See application file for complete search history.

(56) References Cited

U.S. PATENT DOCUMENTS

| | | | |
|---|---|---|---|
| 7,564,979 B2 * | 7/2009 | Swartz | A61B 5/121 381/312 |
| 8,411,887 B2 | 4/2013 | Iwakuni | |
| 8,965,017 B2 * | 2/2015 | Bryant | H04R 25/55 381/314 |
| 2005/0255843 A1 | 11/2005 | Hilpisch | |
| 2008/0285781 A1 | 11/2008 | Aerts | |
| 2009/0076804 A1 * | 3/2009 | Bradford | H04R 25/552 704/203 |

FOREIGN PATENT DOCUMENTS

| | | |
|---|---|---|
| CN | 101310564 A | 11/2008 |
| CN | 201893928 U | 7/2011 |
| CN | 102113350 B | 4/2014 |
| EP | 2 129 088 A1 | 12/2009 |
| TW | 201026096 A1 | 7/2010 |

* cited by examiner

*Primary Examiner* — Huyen D Le
(74) *Attorney, Agent, or Firm* — Winston Hsu; Scott Margo

(57) ABSTRACT

A hearing aid system includes a Bluetooth enabled sound output device and Bluetooth enabled sound output device. The sound output device has a first processor coupled to a first memory, to a first Bluetooth module, to a sound processing module including an amplifier and a speaker, and to a first power supply. The sound input device has an optional aux jack, and a second processer coupled to a second memory, to a second Bluetooth module selectively Bluetooth linkable with the first Bluetooth module, to a sound input module, and to a second power supply. The sound input device may adjust audio volume level of audio signals to a default level before transmission to the sound output device. A second sound input device may transmit audio signals based to the sound input device, from which the audio signals are transmitted to the sound output device.

18 Claims, 5 Drawing Sheets

BLUETOOTH HEARING AID SYSTEM

BACKGROUND OF THE INVENTION

1. Field of the Invention

This application relates to a hearing aid system, and more particularly to a hearing aid system comprising Bluetooth linked sound input and sound output devices.

2. Description of the Prior Art

A hearing aid is defined and regulated by the U.S. Food and Drug Administration (FDA) and is an electroacoustic device which is designed to amplify sound for the wearer, usually with the aim of making speech more intelligible, and to correct impaired hearing as measured by audiometry.

Many categories of hearing aids exist, such as behind the ear, on the ear, in the ear, in the canal, body worn aids, and many more. One difficulty in the use of such hearing aids is the restricted independent mobility between the speaker and the user of the hearing aid. Normally a speaker must remain close to the wearer of a hearing aid so that the hearing aid will receive the spoken sound clearly enough and with enough volume to be useful to the wearer.

Body worn aids are an older form of hearing aid that consisted of a case and an earmold connected by a wire. This wire still constricts independent mobility, distances between the wearer and the speaker, and restricts the number of people that can participate in the conversation due to its one-to-one correspondence between devices.

SUMMARY OF THE INVENTION

A Bluetooth hearing aid system comprises a sound output device having a first processor coupled to a first memory, to a first Bluetooth module, to a sound processing module including an amplifier and a speaker, and to a first power supply; and a sound input device comprising a second processer coupled to a second memory, to a second Bluetooth module selectively Bluetooth linkable with the first Bluetooth module, to a sound input module, and to a second power supply. The sound input device may further comprise an aux jack configured to connect via a cable to an external source of audio signals. The hearing aid system may further comprise a second sound input device selectively Bluetooth linkable to the sound input device with the hearing aid system further configured so that audio signals based on audio signals received by the second sound input device are transmitted via Bluetooth signals from the second sound input device to the sound input device, and audio signals based on the audio signals received by the sound input device are transmitted via Bluetooth signals from the sound input device to the sound output device. The sound input device may be configured to combine audio signals received from the plurality of second sound input devices into a single audio signal before transmission via a Bluetooth signals to the sound output device.

A method of operating a Bluetooth hearing aid system comprising a sound output device having a first processor coupled to a first memory, to a first Bluetooth module, to a sound processing module including an amplifier and a speaker, and to a first power supply; and a sound input device having a second processer coupled to a second memory, to a second Bluetooth module, to a sound input module, and to a second power supply; the method comprising forming a Bluetooth link between the first and the second Bluetooth modules, transmitting audio signals via Bluetooth signals from the sound input device to the sound output device, and the sound processing module outputting the received audio signals after amplification to the speaker. The method may further comprise the sound input device adjusting audio volume level of the audio signals to a default level before transmission via the Bluetooth signals to the sound output device. The Bluetooth hearing aid system may further comprise a second sound input device and the method further comprises forming a Bluetooth link between the second sound input device and the sound input device, transmitting audio signals based on audio signals received by the second sound input device via Bluetooth signals from the second sound input device to the sound input device, and transmitting audio signals based on the audio signals received by the sound input device via Bluetooth signals from the sound input device to the sound output device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
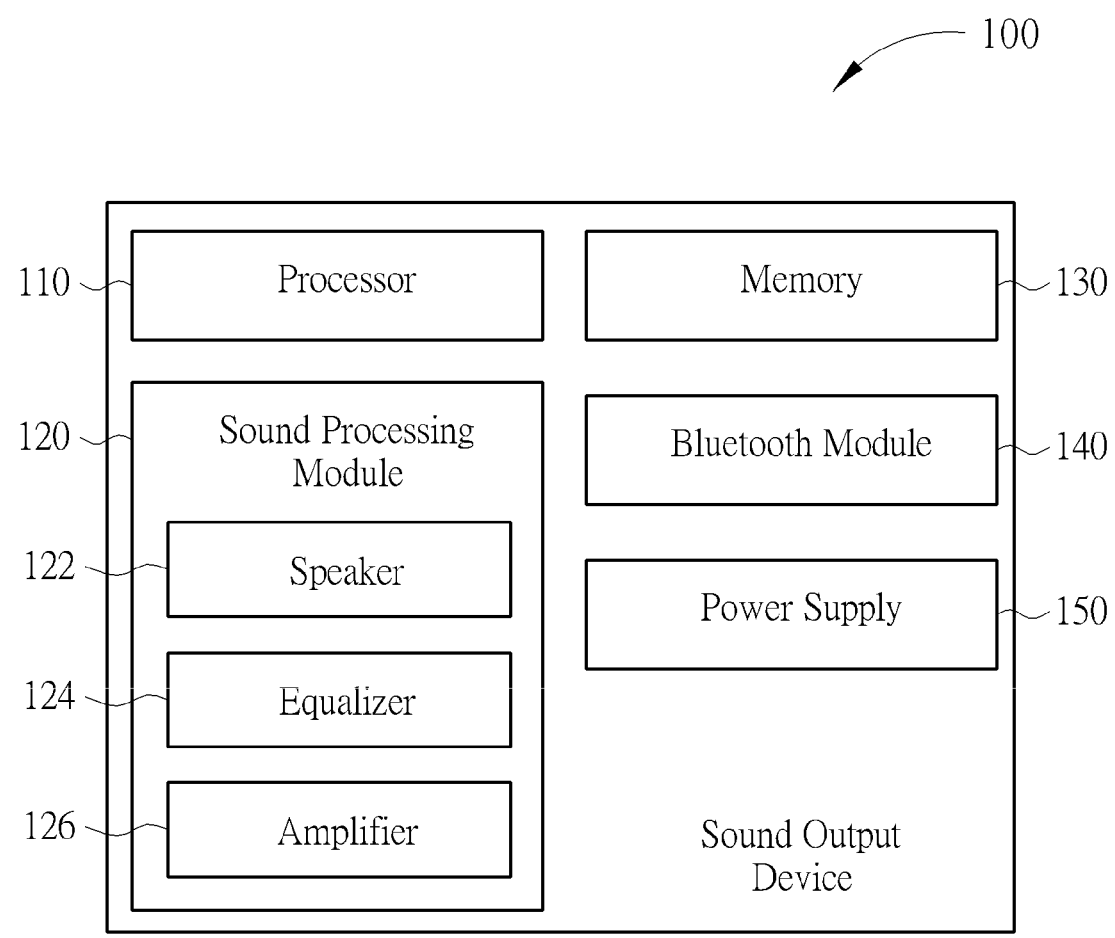
FIG. 1 is a functional block diagram of a sound output device.

FIG. 1 is a functional block diagram of a sound output device 100 which is at least a portion of a hearing aid as defined and regulated by the U. S. Food and Drug Administration (FDA). The sound output device 100 comprises a processor 110, a sound processing module 120, a memory 130, a Bluetooth module 140, and a power supply 150. Depending upon the embodiment, the sound processing module 120 may comprise a speaker 122, an equalizer 124, and/or an amplifier 126. The Bluetooth module 140 qualifies under one or more standards defined by the Bluetooth Special Interest Group (SIG) and is configured to send and/or receive short-wavelength ultra-high frequency radio waves in the industrial, scientific and medical (ISM) band from 2.4 GHz to 2.485 GHz, defined herein as Bluetooth signals, from one or more linked Bluetooth devices. Additionally, throughout this application use of the term "Bluetooth" is intended to refer to the technologies defined under one or more standards defined by the Bluetooth Special Interest Group rather than the source of those technologies.

The processor 110 is configured to control one or more operations of the sound output device 100 by exercising appropriate computer codes stored in the memory 130 which may be of any type suitable for the purpose. The power supply 150 provides operational power to the sound output device 100, and while the power supply 150 is preferably a battery, may be of another type such as solar power or received from a source external to the sound output device 100.

In general, audio signals derived from Bluetooth signals received by the Bluetooth module 140 are routed to the sound processing module 120 and outputted via the speaker 122. Before being outputted, the audio signals may be processed using the equalizer 124 to filter out unwanted noise and to limit the outputted audio signals to one or more desired frequency bands or to amplify desired frequency bands relative to undesired frequency bands. The audio signals may be amplified by the amplifier 126 to levels preferred by a user.

The sound output device 100 may be realized in hardware, in software, or in a combination of hardware and software according to design considerations.

Figure 2:
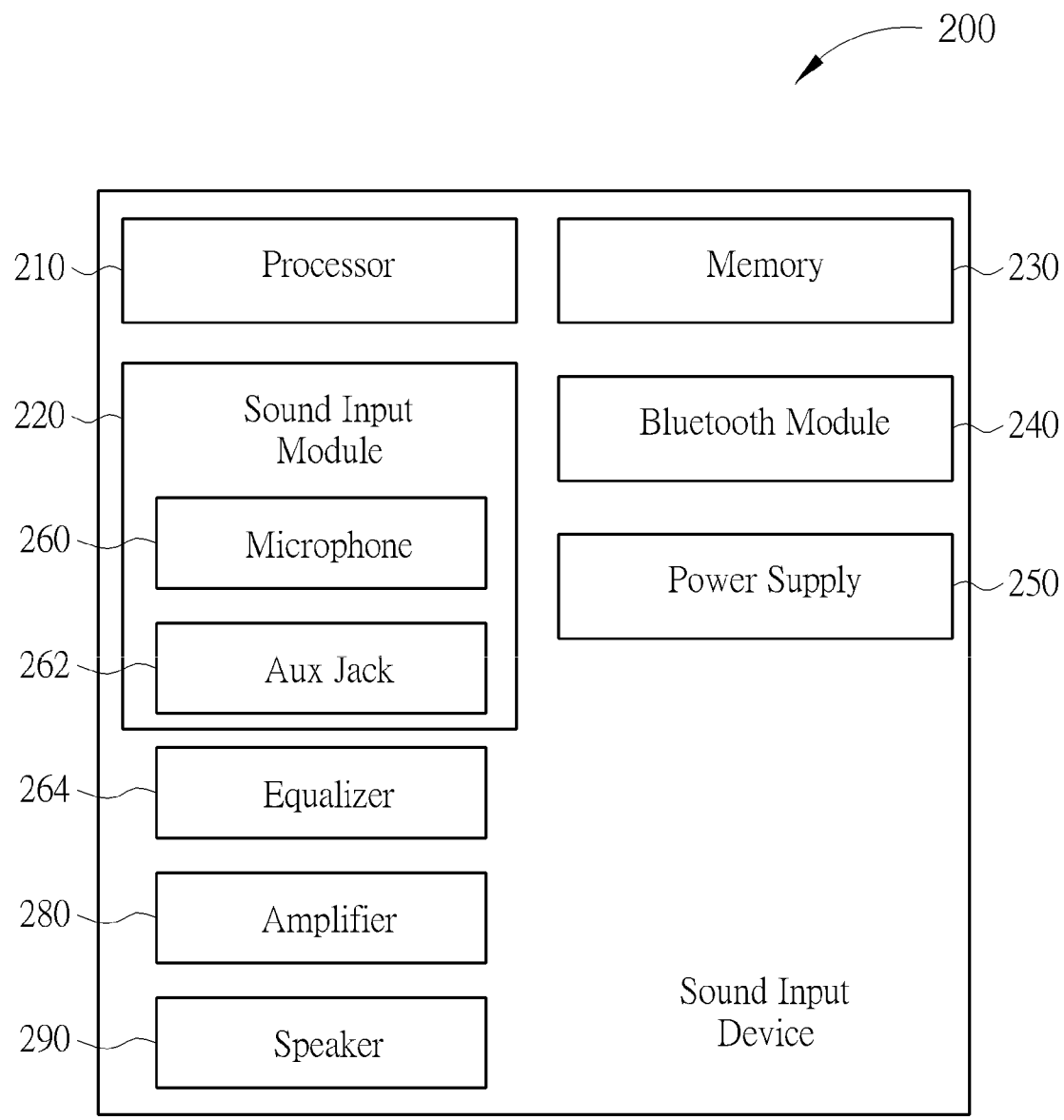
FIG. 2 is a functional block diagram of a sound input device compatible for use with the sound output device of FIG. 1.

FIG. 2 is a functional block diagram of a sound input device 200 compatible for use with the sound output device 100 of FIG. 1. The sound input device 200 comprises a processor 210, a sound input module 220, a memory 230, a Bluetooth module 240, and a power supply 250. Depending upon the embodiment, the sound input module 220 may also comprise a microphone 260 and/or an aux jack 262. When present, the aux jack 262 may be connected via a cable to an auxiliary device so that audio signals may be received from the auxiliary device via the cable. The auxiliary device may be, inter alia, a cell phone, an MP3 player, a television, or an external microphone.

Also depending upon the embodiment, the sound input device 200 may further comprise a speaker 290, an equalizer 264, and/or an amplifier 280. Similarly to the Bluetooth module 140, the Bluetooth module 240 qualifies under one or more standards defined by the Bluetooth Special Interest Group (SIG) and is configured to send and/or receive short-wavelength ultra-high frequency radio waves in the industrial, scientific and medical (ISM) band from 2.4 GHz to 2.485 GHz from one or more linked Bluetooth devices.

The processor 210 may be configured to control one or more operations of the sound input device 200 by exercising appropriate computer codes stored in the memory 230 which may be of any type suitable for the purpose. The power supply 250 provides operational power to the sound input device 200, and while the power supply 250 is also preferably a battery for increased mobility, may be of another type or received from a source external to the sound input device 200.

Audio signals received by the sound input device 200 via the microphone 260, aux jack 262, and/or the Bluetooth module 240 are prepared according to a Bluetooth protocol and transmitted via Bluetooth signals via the Bluetooth module 240 to a second linked Bluetooth device. In some embodiments the second linked Bluetooth device is the sound output device 100 of FIG. 1. In other embodiments, the second linked Bluetooth device in another sound input device 200 which in turn relays the received audio signals, after optional processing, to the sound output device 100 of FIG. 1.

Before transmission to the second linked Bluetooth device, audio signals received by the sound input device 200 via the microphone 260, aux jack 262, and/or the Bluetooth module 240 may be processed using the equalizer 264 to filter out unwanted noise and to limit the outputted audio signals in one or more desired frequency bands and/or the amplifier 126 altering volume of the audio signals to levels suitable for reception by the sound output device 100.

The sound input device 200 may be realized in hardware, in software, or in a combination of hardware and software according to design considerations.

Figure 3:
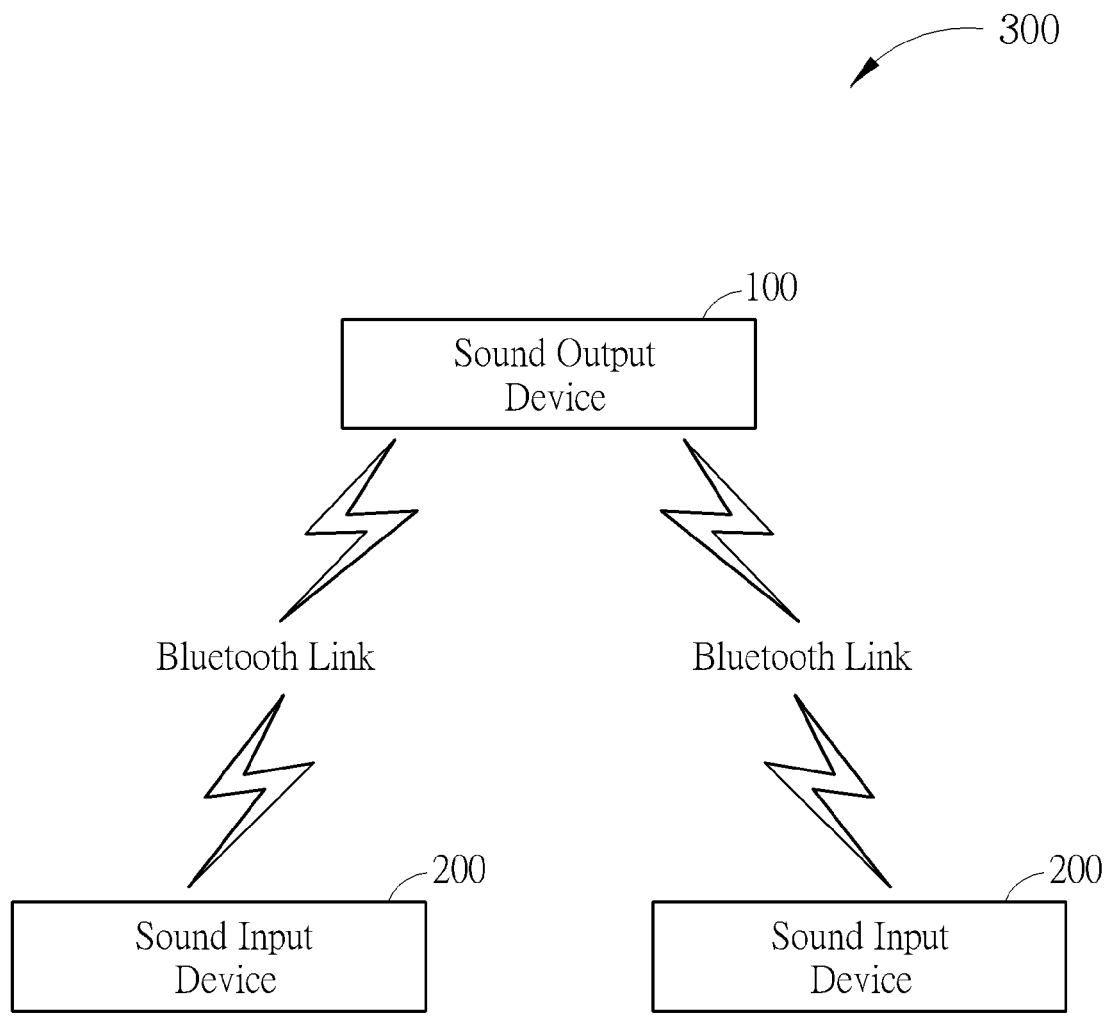
FIG. 3 is a hearing aid system which shows a sound output device linked to one or more sound input devices by a Bluetooth link.

A hearing aid system 300 is shown in FIG. 3 which shows a sound output device 100 linked to one or more sound input devices 200 by a Bluetooth link. When the hearing aid system 300 is turned on, the Bluetooth link(s) may be made automatically or use user input to make the connection to one or more turned on and trusted Bluetooth devices. Examples of user input to make the connection may be, inter alia, pushing a button, or speaking to the device. When speaking to the device is used to make the connection, the speech may be any vocalized sound within a predetermined range or it may be a password or code that is compared using computer code stored in the memory 230 with an authorization password or code also stored in the memory 230, with a connection being formed only when the comparison is determined a match. Some embodiments connect to specific sound input devices 200 according to the specific password or code. For example, a code of "connect to grandpa" may cause a connection to a sound output device 100 worn by "grandpa" to be formed but not cause a connection to another sound output device 100 to be formed.

Preferably, all devices within the hearing aid system have been previously paired and link automatically using stored authorizations or other methods known to one skilled in the art, but this is not a limitation of the hearing aid system 300. Also preferably, all devices within the hearing aid system by default may be set to be "non-discoverable", although some embodiments allow this setting to be changed so that Bluetooth links may be formed with new devices not already considered "trusted".

The hearing aid system 300 is suitable for use when the sound output device 100 is located at a distance from the sound input device 200, as long as the two devices remain within acceptable Bluetooth range, perhaps 10 or fewer meters, does not require close proximity of the devices, and does not restrict independent mobility of users of the devices as long as they remain within the Bluetooth range. An example of use may be when a user preferring use of the sound output device 100 is located across the room from a user of the sound input device 200.

FIG. 3 shows a sound output device 100 Bluetooth linked to two sound input devices 200. As Bluetooth specifications allow up to eight Bluetooth devices to be connected within a single piconet, the hearing aid system 300 permits, but does not require, a plurality of sound input devices 200 to simultaneously be Bluetooth linked to a single sound output device 100. This can be advantageous, for example, when a user who prefers the use of sound output device 100 wishes to easily engage in conversation with a plurality of people scattered across a living room environment.

In general practice, a sound output device 100 would include the equalizer 124 and the amplifier 126, but this is not a requirement. Because the hearing aid system 300 may optionally include the sound output device 100 acting as a master device linked to a plurality of sound input devices 200 acting as slave devices, the burden of processing multiple incoming audio signals substantially simultaneously may prove too much to handle for the sound output device 100, which is normally limited in processing power due to the desired small size and small power supply.

Therefore, some embodiments may include an equalizer 264 and/or amplifier 280 in one or more of the sound input devices 200. This allows the sound input device 200 to pre-filter noises and frequency bands (which may be unique to each sound input device 200 due to environmental factors, etc.) and/or perhaps even adjust amplification of the audio signals to a default level common to each of the linked sound input devices 200 so that the audio signals received by the sound output device 100 are all preprocessed of a similar volume level, minimizing workload, size, and complexity in the sound output device 100. It is preferred, however, that the sound output device 100 does comprise at least an amplifier 126 to allow a user to adjust the final volume outputted from the speaker 122 to a preferred level. Indication of the common default level may be hardware defined or stored in the memory 130 or 230.

In some embodiments, sound input devices 200 provide a user of the respective sound input device 200 means of altering volume of audio signals to be different than the common default level when desired. For example, a user of the sound output device 100 may be listening to soft background music provided by an MP3 player connected to the aux jack 262 of a first sound input device 200 while conversing with a friend using a second sound input device 200. In this case, the audio volume on the first sound input device 100 may be lowered from the common default level and/or the audio volume on the second sound input device may be raised above the common default level to provide the desired respective audio volumes to the user of the sound output device 100.

Figure 4:
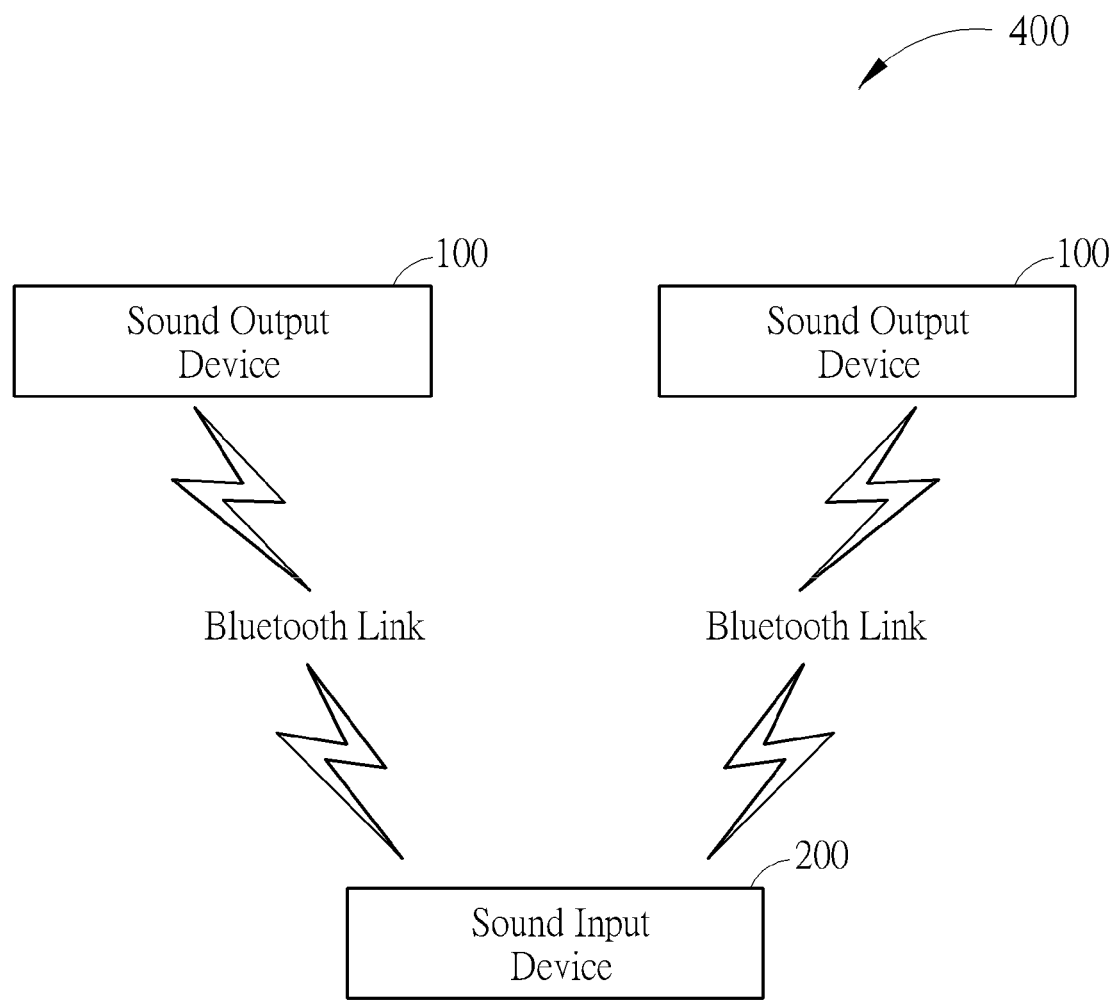
FIG. 4 is a hearing aid system that permits multiple sound output devices to be Bluetooth linked to a single sound input device.

FIG. 4 shows a hearing aid system 400 that permits multiple sound output devices 100 to be Bluetooth linked to a single sound input device 200, which in some embodiments may be acting as a master device. Here, audio signals received by the sound input device 200 are transmitted via Bluetooth signals to each of the sound output devices 100. Similar to the hearing aid system 300, audio signals may be filtered by the equalizer 264 of the sound input device 200 to simplify processing in the sound output devices 100. It is preferred, but not necessary, in this situation that audio processing such as frequency filtering, except for possible noise reduction and volume adjustment to the default common level, is performed independently in each of the sound output devices 100 due to the fact that different frequencies may be desired at each of the sound output devices 100.

Figure 5:
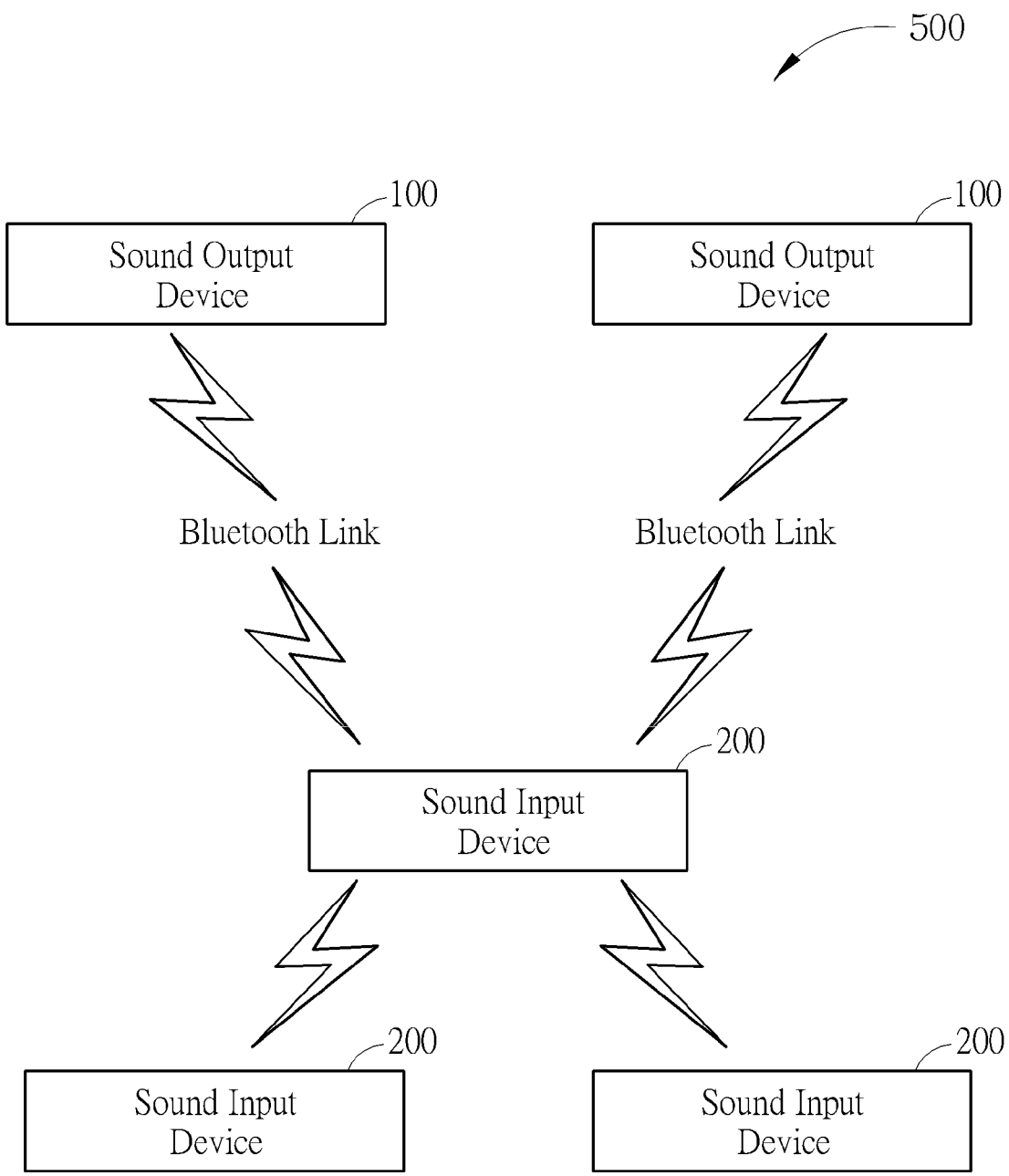
FIG. 5 is a hearing aid system that includes at least one sound output device and first and second sound input devices.

FIG. 5 illustrates a hearing aid system 500 suitable for use in some environments. The hearing aid system 500 includes at least one sound output device 100 and first and second sound input devices 200. The hearing aid system 500 primarily differs from previous embodiments in that a first sound input device 200 acts as a relay device to the second sound input device 200. The first sound input device 200 acting as the relay device may receive audio signals via the microphone 260, the aux jack 262, and/or the Bluetooth module 240 and transmit the audio signals to each sound output device 100 Bluetooth linked to the first sound input device 200 in the hearing aid system 500. The second sound input device 200 is also Bluetooth linked to the first sound input device 200, but is not directly linked to the sound output device 100 other than both may be part of a same piconet or other network.

Audio signals that are received by the second sound input device 200 are transmitted via Bluetooth signals to the first sound input device 200, which relays them and any other received audio signal (after optional processing) via Bluetooth signals to the sound output device 100 for eventual output by the speaker 122.

In the hearing aid system 500, audio signal processing such as noise reduction and/or adjusting volume to the default level may be performed independently by sound input devices 200, but a simpler method may be for the first sound input device to perform the noise reduction and/or adjusting volume to the common default level for all Bluetooth linked sound input devices 200. In some embodiments, all audio signals incoming to the first sound input device 200 are combined either pre or post filtering prior to transmission so that only a single Bluetooth signal is received by the sound output device 100, simplifying processing in the sound output device 100 when compared with reception of multiple signals relayed from the first sound input device 200 round-robin style. As with the hearing aid system 400 depicted in FIG. 4, it is preferred that filtering of audio frequencies is done independently by the sound output device 100 according to the desire of the user.

It is noted that the sound input device 200 used alone, with another device, or in any, some, or all of the hearing aid systems 300, 400, and 500 is not limited to comprising a single Bluetooth module 140. Some embodiments of the sound input device 200 may comprise two or more Bluetooth modules 140, which may be operated independently when desired. One possible use for multiple Bluetooth modules 140 in a single sound input device 200 may be so that each of the Bluetooth modules 140 can form an independent network with other Bluetooth enabled devices.

One advantage of the hearing aid system 500 besides mobility of users is that users of either the sound output device 100 or the second sound input device 200 can join or leave a conversation (or TV show) without interrupting other users of the same hearing aid system 500, a feature particularly useful in group situations. Furthermore, because the first (and/or second) sound input device 200 may operate in half-duplex more, bandwidth can be increased to easily accommodate more sound input devices 200. Use of the first sound input device 200 also effectively extends a maximum distance between a second sound input device 200 and a sound input device 100 to approximately double the normal effective Bluetooth range of about 10 meters. In some embodiments, scatternets may be formed of any combination of at least one sound input device 200 and at least one sound output device 100. For example, a second sound input device 200 may transmit a Bluetooth signal comprising an audio signal to a first sound input device 200, which in turn transmits a Bluetooth signal comprising the modified or unmodified audio signal to another first sound input device 200, which in turn transmits a Bluetooth signal comprising the modified or unmodified audio signal to a sound output device 100. Additionally, formulation of scatternets may be used to further extend the maximum useable distance and/or to increase the number of users of the hearing aid system 500 beyond eight.

In summary, a hearing aid system is disclosed which permits independent mobility and distance between the user of the sound input device 200 and the user of the sound output device 100 via the use of Bluetooth signals linking the devices. Maximizing audio signal processing outside of the sound output device 100 simplifies the tiny circuitry of the sound output device 100. Introduction of a default volume level applied to plural sound input devices 200 simplifies volume control in the sound output device 100 for the user. Using one of the sound input devices 200 as an intermediate device in the network increases flexibility in group situations and increases the usefulness for all users of the hearing aid system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A hearing aid system comprising;
a sound output device comprising a first processor coupled to a first memory, to a first Bluetooth module, to a sound processing module including an amplifier and a speaker, and to a first power supply;

a sound input device comprising a second processor coupled to a second memory, to a second Bluetooth module selectively Bluetooth linkable with the first Bluetooth module, to a sound input module, and to a second power supply; and a second sound input device selectively Bluetooth linkable to the sound input device, the hearing aid system further configured so that audio signals based on audio signals received by the second sound input device equalized according to environmental factors are then transmitted via Bluetooth signals from the second sound input device to the sound input device, and audio signals based on the audio signals received by the sound input device are transmitted via Bluetooth signals from the sound input device to the sound output device.

2. The hearing aid system of claim 1 wherein the sound input device further comprises an aux jack configured to connect via a cable to an external source of audio signals.

3. The hearing aid system of claim 1 wherein the sound input device is further configured to adjust audio volume level of received audio signals to a default level before transmission via Bluetooth signals to the sound output device.

4. The hearing aid system of claim 3 further comprising indication of the default level being stored in the memory of the sound input device or in the memory of the sound output device.

5. The hearing aid system of claim 1 wherein the sound input device further comprises an equalizer configured to filter noises and predefined frequency bands from received audio signals before transmission via a Bluetooth signals to the sound output device.

6. The hearing aid system of claim 1 wherein the sound input device is configured to selectively Bluetooth link to a plurality of second sound input devices.

7. The hearing aid system of claim 6 wherein the sound input device is further configured to combine audio signals received from the plurality of second sound input devices into a single audio signal before transmission via a Bluetooth signals to the sound output device.

8. The hearing aid system of claim 1 wherein the second sound input device further comprises a third Bluetooth module coupled to a third processor.

9. The hearing aid system of claim 8 wherein the second sound input device is configured to operate the third Bluetooth module independently from operation of the second Bluetooth module.

10. A method of operating hearing aid system comprising;

a sound output device having a first processor coupled to a first memory, to a first Bluetooth module, to a sound processing module including an amplifier and a speaker, and to a first power supply;

a sound input device having a second processor coupled to a second memory, to a second Bluetooth module, to a sound input module, and to a second power supply; and a second sound input device having a third processor coupled to a third memory, to a third Bluetooth module, to a sound input module, to an equalizer, and to a third power supply;

the method comprising;

forming a first Bluetooth link between the first and the second Bluetooth modules;

forming a second Bluetooth link between the second and the third Bluetooth modules;

receiving audio signals via the sound input module of the second sound input device to generate received audio signals;

equalizing the received audio signals via the equalizer according to environmental factors to generate equalized audio signals;

transmitting the equalized audio signals from the second sound input device to the sound input device via the second Bluetooth link;

transmitting the equalized audio signals from the second Bluetooth module to the first Bluetooth module via the first Bluetooth link; and the sound processing module of the sound output device outputting audio signals received by the first Bluetooth module after amplification to the speaker.

11. The method of claim 10 wherein the sound input device further comprises an aux jack configured to connect via a cable to an external source of audio signals, the method further comprising transmitting audio signals received from the external source via Bluetooth signals from the sound input device to the sound output device.

12. The method of claim 10 further comprising the sound input device adjusting audio volume level of the audio signals to a default level before transmission via the Bluetooth signals to the sound output device.

13. The method of claim 12 further comprising storing an indication of the default level in the memory of the sound input device or in the memory of the sound output device.

14. The method of claim 10 wherein the sound input device further comprises an equalizer and the method further comprises filtering noises and predefined frequency bands from the audio signals before transmission via Bluetooth signals to the sound output device.

15. The method of claim 10 further comprising forming a Bluetooth link respectively between the sound input device and a plurality of second sound input devices.

16. The method of claim 15 further comprising the sound input device combining audio signals received from the plurality of second sound input devices into a single audio signal before transmission via a Bluetooth signals to the sound output device.

17. The method of claim 10 further comprising comparing a vocalized sound received by the sound input device to an authorization password or code stored in the memory of the sound input device, with the Bluetooth link being formed only when the comparison is determined a match.

18. The method of claim 10 wherein the method further comprises forming a different network using the third Bluetooth module than a network formed using the second Bluetooth module.

* * * * *